United States Patent
Oba et al.

[11] Patent Number: 5,920,106
[45] Date of Patent: Jul. 6, 1999

[54] SEMICONDUCTOR DEVICE AND METHOD FOR PRODUCING THE SAME

[75] Inventors: Nobukazu Oba, Gamagori; Toshio Ikuta, Handa; Minekazu Sakai, Kariya; Tsuyoshi Fukada, Aichi-gun; Yasutoshi Suzuki, Okazaki, all of Japan

[73] Assignee: Denso Corporation, Kariya, Japan

[21] Appl. No.: 08/987,500

[22] Filed: Dec. 9, 1997

[30] Foreign Application Priority Data

Dec. 10, 1996 [JP] Japan .................................. 8-329975

[51] Int. Cl.⁶ .................................................. H01L 29/84
[52] U.S. Cl. ............................ 257/419; 257/108; 438/53
[58] Field of Search .................................. 257/415, 417, 257/418, 419, 108; 438/53, 50

[56] References Cited

U.S. PATENT DOCUMENTS

| | | | |
|---|---|---|---|
| 4,131,524 | 12/1978 | Gieles ...................................... | 257/419 |
| 4,459,855 | 7/1984 | Yamagami ............................... | 257/419 |
| 4,670,969 | 6/1987 | Yamada et al. .......................... | 257/419 |
| 4,672,411 | 6/1987 | Shimizu et al. ......................... | 257/419 |
| 4,721,938 | 1/1988 | Stevenson ............................... | 257/419 |
| 4,885,621 | 12/1989 | Yoder et al. ............................. | 257/419 |
| 5,058,435 | 10/1991 | Terry et al. .............................. | 73/727 |
| 5,074,152 | 12/1991 | Ellner et al. ............................. | 73/766 |
| 5,387,316 | 2/1995 | Pennell et al. .......................... | 156/647 |
| 5,525,549 | 6/1996 | Fukada et al. ........................... | 438/53 |
| 5,654,244 | 8/1997 | Sakai et al. .............................. | 438/53 |

FOREIGN PATENT DOCUMENTS

| | | | |
|---|---|---|---|
| 58-078470 | 5/1983 | Japan .................................... | 257/419 |
| 58-078471 | 5/1983 | Japan .................................... | 257/419 |
| 63-029981 | 2/1988 | Japan .................................... | 257/419 |
| 63-065679 | 3/1988 | Japan .................................... | 257/419 |
| 2-100372 | 4/1990 | Japan .................................... | 257/419 |
| 2-218171 | 8/1990 | Japan .................................... | 257/419 |

*Primary Examiner*—David B. Hardy
*Attorney, Agent, or Firm*—Pillsbury Madison & Sutro LLP

[57] ABSTRACT

A semiconductor pressure detection device includes a diaphragm formed at a portion of a P− conductivity type semiconductor substrate having a reduced thickness. Gauge resistors are formed on the surface of an N− conductivity type semiconductor layer formed on the substrate. An N+ conductivity type diffusion layer is formed in the N− conductivity type semiconductor layer to fix the electric potential of the N− conductivity type layer. The first conductivity type area surrounds the diaphragm. Therefore, when the N− conductivity type area is supplied with electric potential, the potential gradient in the N− conductivity type layer is small. Thus, the leakage current which flows to a pn junction between the gauge resistors and the N− conductivity type area is reduced.

19 Claims, 10 Drawing Sheets

FIG. IA
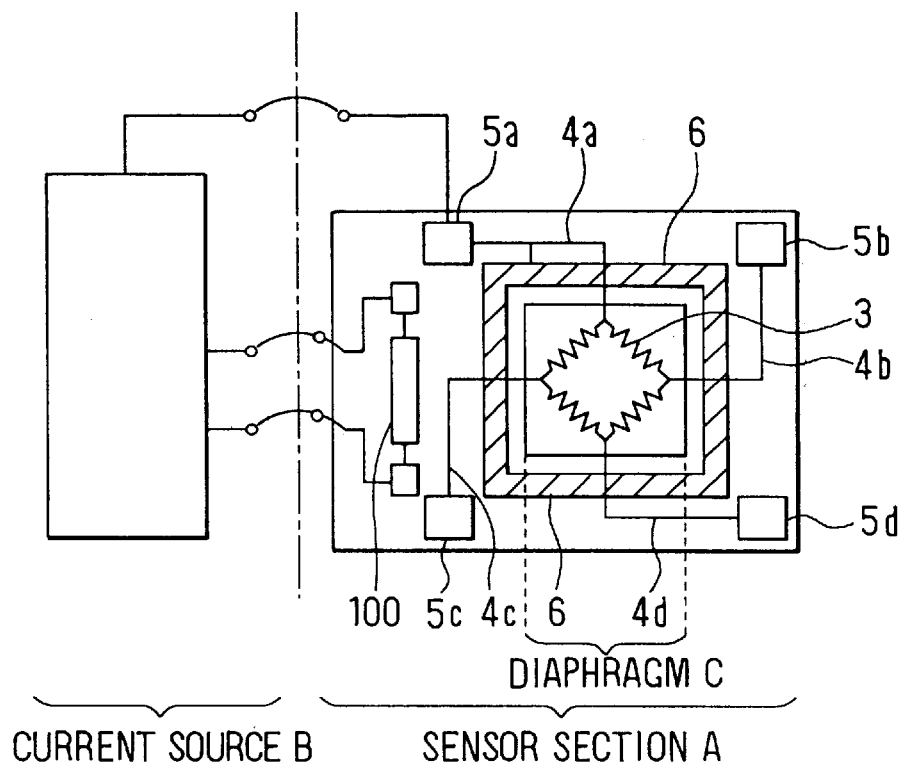
CURRENT SOURCE B   SENSOR SECTION A
FIG. IB
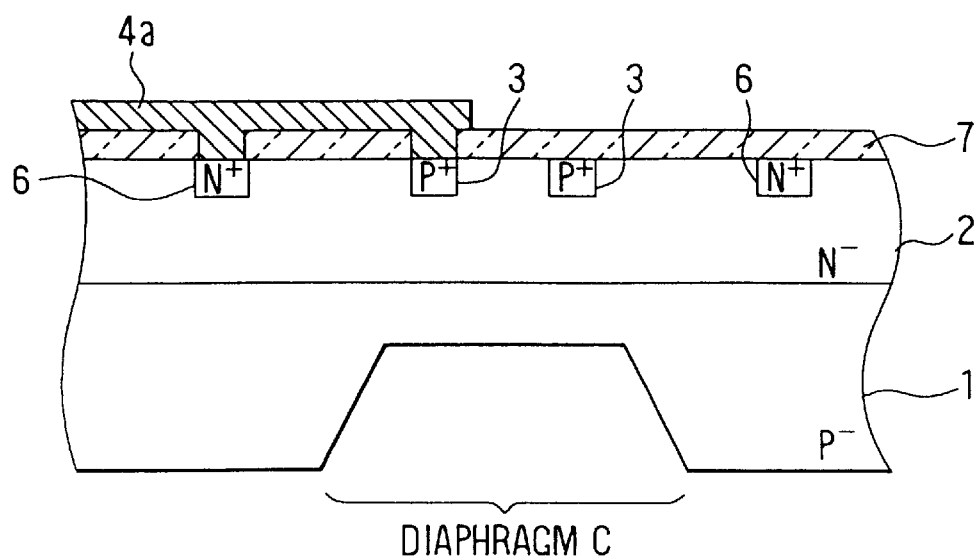
DIAPHRAGM C

DIAPHRAGM C

DIAPHRAGM C

DIAPHRAGM C

SEMICONDUCTOR DEVICE AND METHOD FOR PRODUCING THE SAME

CROSS REFERENCE TO RELATED APPLICATION

This application is based upon and claims priority from Japanese Patent Application No. Hei 8-329975 filed on Dec. 10, 1996, the contents of which are incorporated herein by reference.

BACKGROUND OF THE INVENTION

1. Field of the Invention

The present invention relates to a semiconductor device having a diaphragm, which can be used as a semiconductor pressure detection device which detects pressure by using the diaphragm, and a method for producing the semiconductor device.

2. Related Art

A sectional view and a plan view of a conventional semiconductor pressure sensor are shown in FIGS. 12A and 12B respectively. As shown in FIG. 12A, the semiconductor pressure sensor includes P− type silicon wafer 1 having a diaphragm C formed by removing a part of the P− type silicon wafer 1, and an N− type epitaxial layer 2. As shown in FIG. 12B, P+ type diffusion gauge resistors (piezoresistances) 3 corresponding to a bridge circuit are formed over the diaphragm C. Aluminum wirings 4a–4d connected with their outer terminals are formed at edges of the gauge resistors 3. The aluminum wiring 4a is connected with an N+ type diffusion layer 6 which is formed on the surface of the N− type epitaxial layer 2, and also connected with a power terminal 5a of the bridge circuit. The aluminum wiring 4d is connected with a ground terminal 5d of the bridge circuit. In operation, current flows from the power terminal of the bridge circuit through the aluminum wiring 4a, and electric potential is supplied to the gauge resistors 3. When the diaphragm C is displaced by pressure and the gauge resistors 3 are stretched or contracted, the resistance of the gauge resistors 3 is changed. Thus, the electric potential at the mid-point of the bridge circuit is changed. The pressure is detected based on the electric potential of the mid-point.

The electric potential of the N− type epitaxial layer 2 is fixed to a predetermined voltage through the N+ type diffusion layer 6. The electric potential of the N− type epitaxial layer 2 is determined so that the electric potential of the N+ type diffusion layer 6 and the N− type epitaxial layer 2 are greater than or equal to the electric potential of the gauge resistors 3. The electric potential of gauge resistors 3 is greater than or equal to ground (0 electric potential). As a result, a forward bias is not provided between the N− type epitaxial layer 2 and the gauge resistors 3.

However, in the above-described semiconductor pressure sensor, because a small leakage current actually flows between the N− type epitaxial layer 2 and the P− type silicon substrate 1, a potential difference may exist across the N− type epitaxial layer 2. Therefore, the above-described relation of the electric potential of the N+ type diffusion layer 6, the N− type epitaxial layer 2 and the gauge resistors 3 may not be maintained.

The potential distribution of the conventional semiconductor pressure sensor is shown in FIGS. 13A and 13B. The electric potential of the N− type epitaxial layer 2 near the gauge resistors 3 may be less than that of the gauge resistors 3. As a result, the pn junction between the N− type epitaxial layer 2 and the gauge resistors 3 becomes forward biased, and a larger leakage current flows from the gauge resistors 3 to the N− type epitaxial layer 2. As a result, the current which flows in the gauge resistors 3 can change, and it becomes impossible to accurately detect pressure.

SUMMARY OF THE INVENTION

The present invention is made in light of the foregoing problems, and it is an object of the present invention to provide a semiconductor device with a very small leakage current. Another object of the present invention is to provide a method of producing a semiconductor device having the above-mention characteristic.

For attaining the object, an exemplary device according to the present invention has a semiconductor substrate defining a diaphragm, a first conductivity type layer, gauge resistors of a second conductivity type formed over the diaphragm and a first conductivity type area for fixing the electric potential of the first conductivity type layer. The first conductivity type area surrounds at least one part of the diaphragm, and gauge resistors are formed within the first conductivity type area. According to the above-described construction, when the first conductivity type area is supplied with electric potential, potential variation across the area can be small. Thus, leakage current which flows across the pn junction between the gauge resistors and the first conductivity type area is prevented.

Electric wirings are connected to ends of the gauge resistors. One of the electric wirings is connected to ground. The first conductivity type area need not be formed under the one electric wiring which is connected to ground. This construction prevents dielectric breakdown caused by the potential difference generated from noise between the first conductivity type area and the electric wiring connected to ground.

A temperature compensation resistor may be formed in the first conductivity type layer outside of the first conductivity type area. According to this construction, because the first conductivity type layer is positioned between the temperature compensation resistor and the diaphragm and carriers can move to the temperature compensation resistor without passing the area surrounding the gauge resistors, oscillation caused by feedback is prevented.

The diaphragm may be formed by an electrochemical etching whose electric potential is supplied to the first conductivity type layer. According to this aspect, the potential distribution is stable, and the thickness of the diaphragm is constant.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIG. 1A is a plan view of a semiconductor pressure detection device according to a first embodiment of the present invention;

FIG. 1B is a sectional view of a sensor section A of the semiconductor pressure detection device according to a first embodiment of the present invention;

DETAILED DESCRIPTION OF THE PREFERRED EMBODIMENTS

Figure 2A:
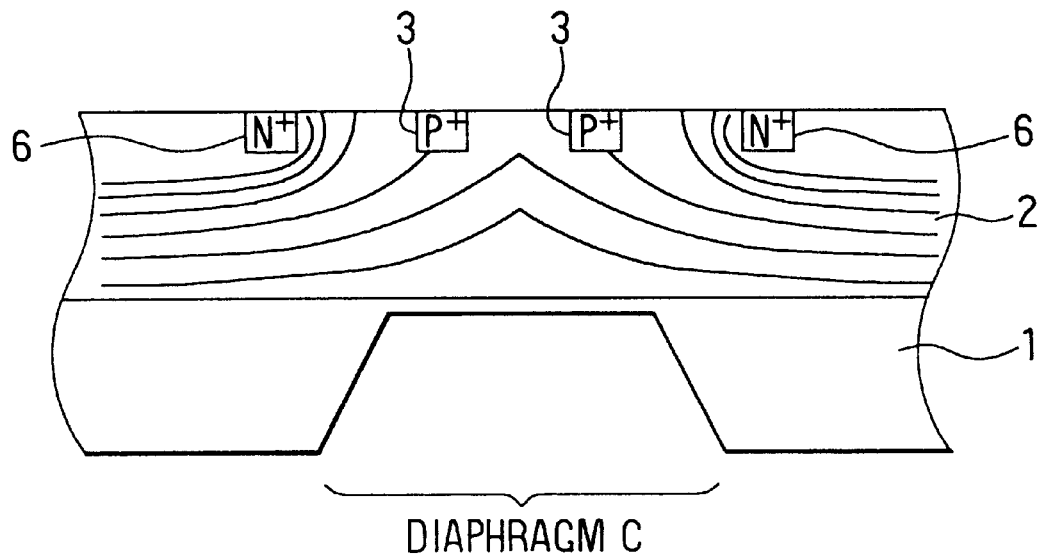
FIG. 2A is a sectional view of the potential distribution in the sensor section A of the semiconductor pressure detection device shown in FIG. 1B.

Preferred embodiments of the present invention are now described in detail with reference to drawings.

(First Embodiment)

FIG. 1A illustrates a plan view of the semiconductor pressure detection device according to a first embodiment of the present invention. As shown in FIG. 1A, the semiconductor pressure detection device includes a sensor section A which has a semiconductor pressure sensor and a current source B including a power source, amplifier and a regulator (all of them are not shown). The sensor section A and the current source B are formed in a semiconductor chip, and each chip is connected with metal wirings. A temperature compensation resistor 100 is formed in the semiconductor chip on which the semiconductor pressure sensor is formed, and current which flows in the semiconductor pressure sensor from the current source is feedback controlled based on the resistance change of the compensation resistor 100.

FIG. 1B illustrates a sectional view of the semiconductor pressure detection device according to this embodiment. The structure of the semiconductor pressure sensor is described in detail with reference to FIGS. 1A and 1B as follows. As shown in FIG. 1B, a substrate of the semiconductor pressure sensor consists of a P– type silicon wafer 1 and an N– type epitaxial layer 2 which is epitaxially grown on the P– type silicon wafer 1. A diaphragm C is formed by removing part of the P– type silicon wafer 1. Gauge resistors (piezoresistances) 3 made from a P+ type diffusion layer are formed over the diaphragm C and in the surface of the N– type epitaxial layer 2. A passivation layer is formed on the external surface of the N– type epitaxial layer 2 (not shown).

As shown in FIG. 1A, each of the gauge resistors 3 is connected to compose a bridge circuit, aluminum wirings 4a–4d are formed so that one end of each of the aluminum wiring 4a–4d is connected with a junction between two gauge resistors 3, and the other end of each of the aluminum wirings 4a–4d is connected with one of the bonding pads 5a–5d. An N+ type diffusion layer 6 (indicated by slanted lines in FIG. 1A) is formed a predetermined distance apart from the perimeter of the diaphragm C. The gauge resistors 3 and the N+ type diffusion layer 6 are covered with an oxide film formed on the N– type epitaxial layer 2, and the aluminum wiring 4a–4d are connected with the N+ type diffusion layer 6 and the gauge resistors 3 through contact holes formed in predetermined portions of the oxide 7. The bonding pad 5a formed in the sensor section A is connected with a power terminal of the current source B, and is supplied with the highest electric potential among bonding pads 5a–5d. The bonding pad 5d is connected with a ground terminal. The mid-point electric potential of the bridge is outputted from the bonding pads 5b and 5c.

Any wiring methods other than the method described above may be used to connect the gauge resistors 3 with the N+ type diffusion layer 6. For example, the gauge resistors 3 can be connected with the current source B through the aluminum wiring 4a and the bonding pad 5a, the N+ type diffusion layer 6 can be connected with another outside power source (not shown) different from the current source B through another aluminum wiring (not shown) different from the aluminum wiring 4a and another bonding pad (not shown) different from the bonding pad 5a. In this situation, constant current flows into the gauge resistors 3 and the highest voltage is supplied to the N+ type diffusion layer 6.

Operation of the above-described semiconductor pressure detection device is now described in detail. As rated current flows to each of the gauge resistors 3 through the bonding pad 5a, an electric potential develops across each of the gauge resistors 3. When the diaphragm C is displaced by the pressure, and the gauge resistors 3 are stretched or contracted based on the displacement of the diaphragm C. The stretched or contracted gauge resistors 3 change resistance, and also change the mid-point electric potential of bonding pads 5b–5c. Since the resistance of the gauge resistors 3 is changed responsive to heat depending from the current flowing in the gauge resistors 3 or atmospheric temperature, the current is continually controlled based on output from the temperature compensation resistor 100.

Figure 2B:
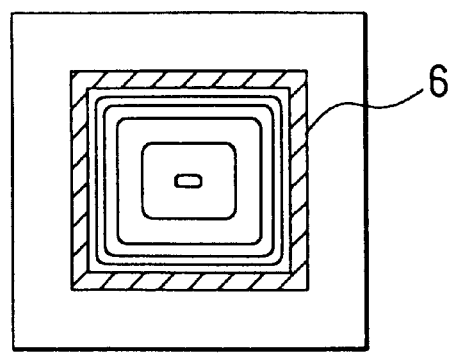
FIG. 2B is a plan view of the potential distribution in the sensor section A of the semiconductor pressure detection device.
Figure 13A:
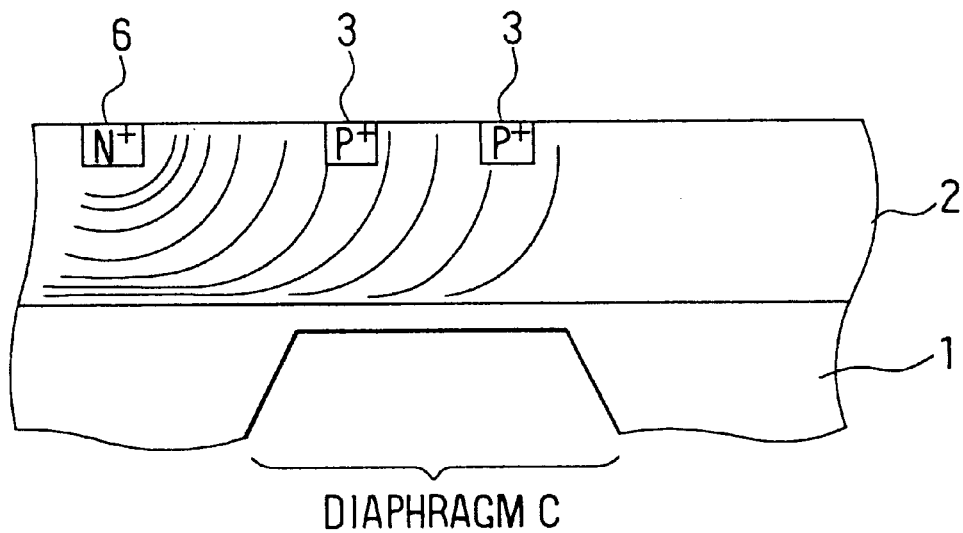
FIG. 13A is a sectional view of the potential distribution of the semiconductor pressure detection device in FIG. 12A.
Figure 13B:
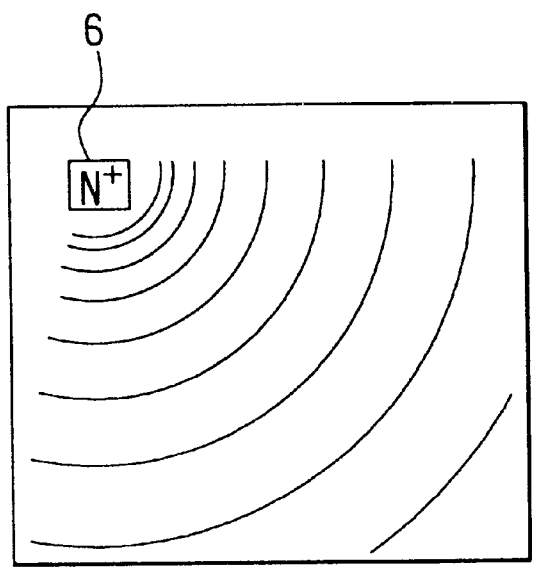
FIG. 13B is a plan view of the potential distribution of the semiconductor pressure detection device in FIG. 12A.

FIGS. 2A and 2B show the potential distribution in the sensor section A of the semiconductor pressure detection device according to the present embodiment. As shown in FIG. 2A, because the electric potential of the N+ type diffusion layer 6 formed around the diaphragm C is constant, variation of the electric potential from the N+ type diffusion layer 6 to a border between the gauge resistors 3 and the N– type epitaxial layer 2 is smaller than in FIGS. 13A and 13B. Therefore, it is possible to prevent a pn junction between the gauge resistors 3 and the N– type epitaxial layer 2 from being forward biased, and also prevent large leakage current from flowing in the N− type epitaxial layer 2 even when a potential gradient is formed between the gauge resistors 3 and the N− type epitaxial layer 2.

Figure 3A:
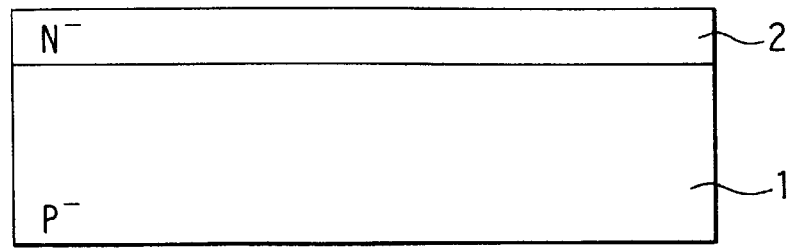
FIGS. 3A–3C are sectional views of steps for producing the semiconductor pressure detection device shown in FIG. 1B.
Figure 3B:
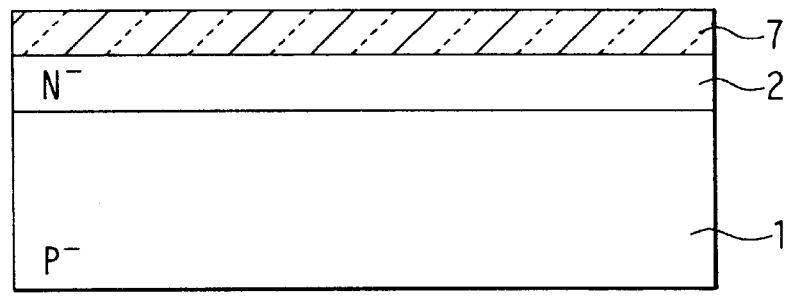
Figure 3C:
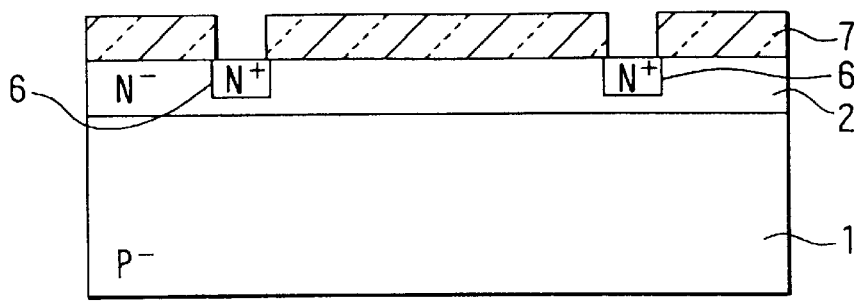

The process of producing the semiconductor pressure detection device shown in FIG. 1B is now described in detail with reference to FIGS. 3A–4C. First, as shown in FIG. 3A, the N− type epitaxial layer 2 is epitaxially grown ed on the P− type silicon wafer 1, and as shown in FIG. 3B, the oxide film 7 is formed on the entire upper surface of the N− type epitaxial layer 2. Predetermined portions of the oxide film 7 is etched by a photo lithography etching. Then, phosphorus ions are implanted or deposited through the etched portion of the oxide film 7 and the phosphorus ions are diffused into the N− type epitaxial layer 2 (depth of diffusion is 2.0–2.5 $\mu$m), thus, as shown in FIG. 3C, the N+ type diffusion layer 6 is formed. As described above, the N+ type diffusion layer 6 is formed so as to surround an area where the diaphragm C will be formed.

Figure 4A:
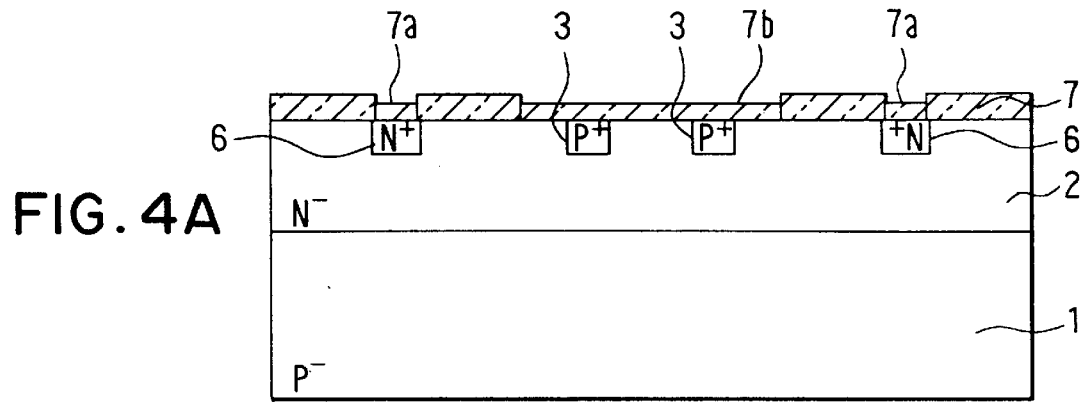
FIGS. 4A–4C are sectional views of steps following the step shown in FIG. 3C for producing the semiconductor pressure detection device.
Figure 4B:
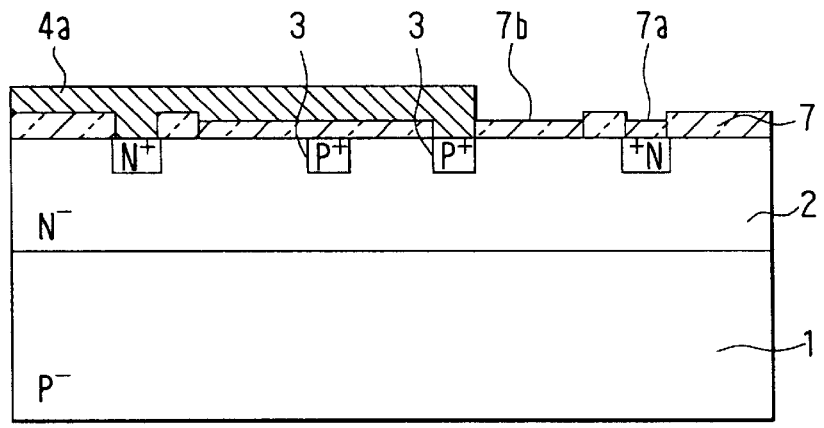
Figure 4C:
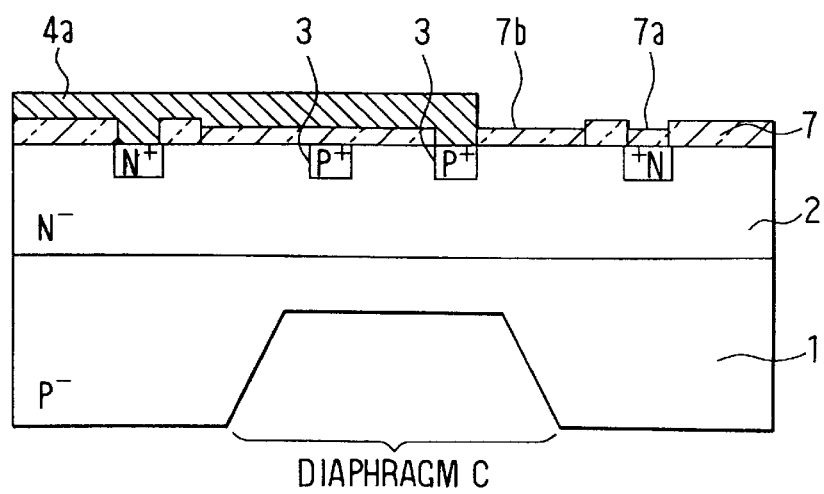

As shown in FIG. 4A, the etched portion used for forming the N+ type diffusion layer 6 is covered with an oxide film 7a, and some portion of the oxide film 7 within the N+ type diffusion layer 6 is etched. An oxide film 7b is formed in the etched portion, and boron ions are implanted through the oxide film 7b. Then, the boron ions are diffused into the N− type epitaxial layer 2 (depth of diffusion is 1.0–1.5 $\mu$m), forming the gauge resistors 3. Some contact holes are formed into the oxide film 7b. After that, as shown in FIG. 4B, the patterned aluminum wirings 4a–4d are formed to connect with the gauge resistors 3 through the contact holes. As a result, a bridge circuit is formed by the gauge resistors 3 and the aluminum wirings 4a–4d. The aluminum wiring 4a is connected with the N+ type diffusion layer 6. One end of each of the aluminum wirings 4a–4d is connected with one of the bonding pads 5a–5d shown in FIG. 1A.

To conduct electrochemical etching, a predetermined voltage Vcc is supplied to the N+ type diffusion layer 6 from the bonding pad 5a through the aluminum wiring 4a. At the same time, the surface of the P− type silicon wafer 1 opposite the N− type epitaxial layer 2 is etched, forming the diaphragm C. The portion of the P− type silicon wafer 1 where the diaphragm C is formed is 1–2 $\mu$m thick.

The etching of the P− type silicon wafer 1 is stopped because an oxide film is formed on the P− type silicon wafer 1 responsive to an anodic oxidation reaction when the electric potential of the silicon is larger than the passivation voltage. When the predetermined voltage Vcc which is larger than the passivation voltage is supplied to the N− type epitaxial layer 2, a depletion layer is formed at the pn junction, and the etching is stopped at the edge of the depletion layer in the P− type silicon wafer 1. When the diaphragm C is formed by etching the surface of the P− type silicon wafer 1, the thickness of the depletion layer should be constant so that the thickness of the diaphragm C is constant. It is desirable that the electric potential of the entire N− type epitaxial layer 2 is the same as the predetermined voltage Vcc, when the predetermined voltage Vcc is supplied to the N+ type diffusion layer 6. However, in fact, a potential gradient is formed in the N− type epitaxial layer 2. Thus, the thickness of the depletion layer is not constant, and it is difficult to keep the thickness of the diaphragm C constant.

In this embodiment, the above-described problem is solved as follows. When the predetermined voltage Vcc is supplied to the N+ type diffusion layer 6, the electric potential of the entire N+ type diffusion layer 6 approximates the same potential, that is, the electric potential of the entire ring-shaped N+ type diffusion layer 6, formed around the gauge resistors 3, is the same potential. Since the N+ type diffusion layer 6 is formed around the area where diaphragm C is formed, the electric distribution extends almost parallel to the surface of the P− type silicon wafer 1 when the predetermined voltage Vcc is supplied to the N+ type diffusion layer 6. Therefore, the thickness of the diaphragm C is more uniform because the electric distribution is stable.

The temperature compensation resistor 100 in the semiconductor chip is concurrently formed between forming the oxide and forming the aluminum wirings, and is connected with the current source B through bonding pads. Thus, the semiconductor pressure detection device shown in FIGS. 1A and 1B is completed.

Figure 5A:
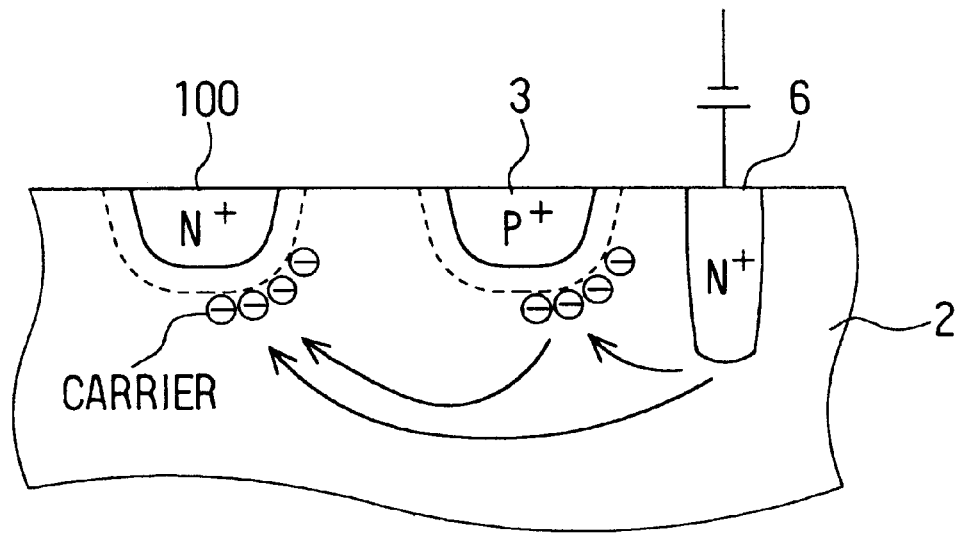
FIG. 5A is a partial sectional view of a state in which carriers are moving when an N+ type diffusion layer 6 is not formed between gauge resistors 3 and a temperature compensating resistor 100.

When the N+ type diffusion layer 6 is formed around the area where the diaphragm C is formed, an oscillation is prevented. FIG. 5A shows a sectional view of a conventional sensor section A when the temperature compensation resistor 100 is formed in the chips in which the sensor section A is formed but far from the N+ type diffusion layer 6. When the semiconductor pressure detection device such as FIG. 5A is operated, it has been verified that an oscillation occurred as a result of interaction between the gauge resistors 3 and a temperature detection device (not shown).

At one pn junction between the gauge resistors 3 and the N− type epitaxial layer 2, the depletion layer is formed not only in the gauge resistors 3 made of the P+ type diffusion layer but also in the N− type epitaxial layer 2 because of the voltage generated by the predetermined current flowing from the current source B to the gauge resistors 3. A parasitic capacitor results from this depletion layer. Also, at the other pn junction between the temperature compensation resistor 100 and the N− type epitaxial layer 2, another depletion layer is formed in not only the temperature compensation resistor 100 made of the P+ type diffusion layer but also in the N− type epitaxial layer 2. Thus, a parasitic capacitor results from this depletion layer also. Carriers are supplied to the two depletion layers from the current source through the N+ type diffusion layer 6. In this situation, when the electric potentials of the gauge resistors 3 are changed, the depletion layers of the gauge resistors 3 are changed, and the carries move responsive to the width of the depletion layer.

As described above, the temperature compensation resistor 100 is formed in the same chip where the diaphragm is formed, and because the temperature compensation resistor 100 is farther from the N+ type diffusion layer 6 than the gauge resistors 3, the carriers move to the temperature compensation resistor 100 through the area surrounding of the gauge resistors 3. Therefore, carriers moving to the temperature compensation resistor 100 are influenced by the carriers moving to the gauge resistors 3. The electric potential of the N− type epitaxial layer 2 around the temperature compensation resistor 100 is changed by the above-described influence, and the thickness of the depletion layer is also changed. Also, the resistance of the temperature compensation resistor 100 is changed, and the amount of current supplied from the current source B is changed. Therefore, the current source B supplies a wrong amount of current to the sensor section A, and feedback control is continued based on the wrong amount of current. Finally, oscillation occurs.

Figure 5B:
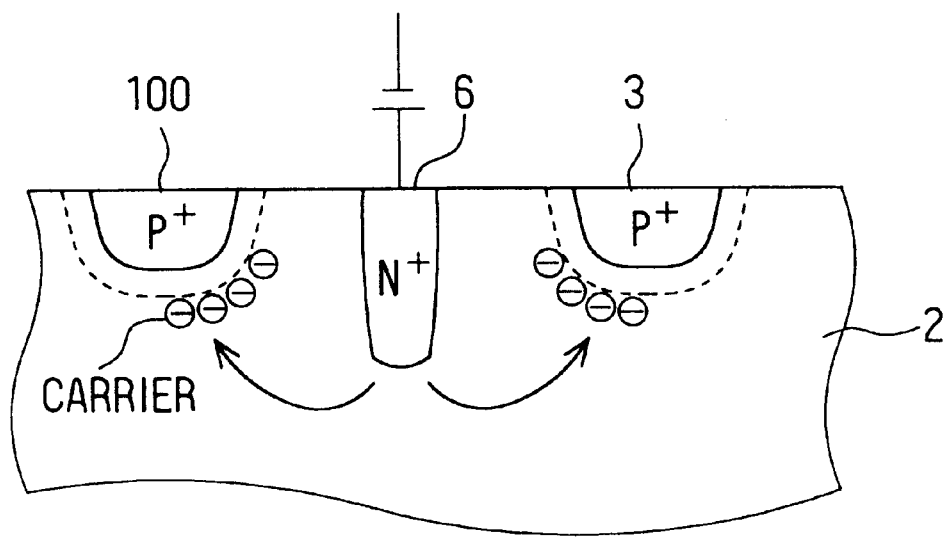
FIG. 5B is a partial sectional view of a state in which carriers are moving when the N+ type diffusion layer 6 is formed between gauge resistors 3 and the temperature compensating resistor 100.

FIG. 5B shows a sectional view of the surrounding N+ type diffusion layer 6 in the sensor section A according to this embodiment. As shown in FIG. 5B, the depth of the N+ type diffusion layer 6 is approximately double that of both of the gauge resistors 3 and the temperature compensation resistor 100 which are made of P+ type diffusion layer. In operation, the highest potential is supplied to the N+ type diffusion layer 6, and depletion layers are formed at pn junctions between the gauge resistors 3 or the temperature compensation resistor 100 and the N− type epitaxial layer 2. Since the movement of carriers at the depletion layers is executed through the N+ type diffusion layer 6, and the N+ type diffusion layer 6 is formed between the temperature compensation resistor 100 and the N+ type diffusion layer 6, carriers can move to the temperature compensation resistor 100 without passing the area surrounding gauge resistors 3.

The highest electric potential in this embodiment refers to a relationship where the electric potential of the N+ type diffusion layer 6 is greater than or equal to the electric potential of the gauge resistors 3. This electric potential is set so that the potential of the N+ type diffusion layer 6 and the potential of the N− type epitaxial layer 2 can be kept at the same or larger potential as the gauge resistors 3 to prevent the pn junction from being forward biased. In this situation, it is better to set the potential of the gauge resistors 3 to a high voltage so that the pressure sensor has high sensitivity. When the potential of the N+ type diffusion layer 6 and the potential of the N− type epitaxial layer 2 are set at the highest voltage as this embodiment, it is possible to not only satisfy the above relation but also improve sensitivity. As described above, according to this embodiment, oscillations can be prevented, and it is possible to precisely detect pressure.

In this embodiment, the N+ type diffusion layer 6 is formed so that it surrounds the entire diaphragm C. However, it is sufficient to form the N+ type diffusion layer 6 having a length the same as the length of gauge resistors 3, between the gauge resistors 3 and the temperature compensation resistor 100. This arrangement will prevent oscillations.

(Second Embodiment)

Figure 6:
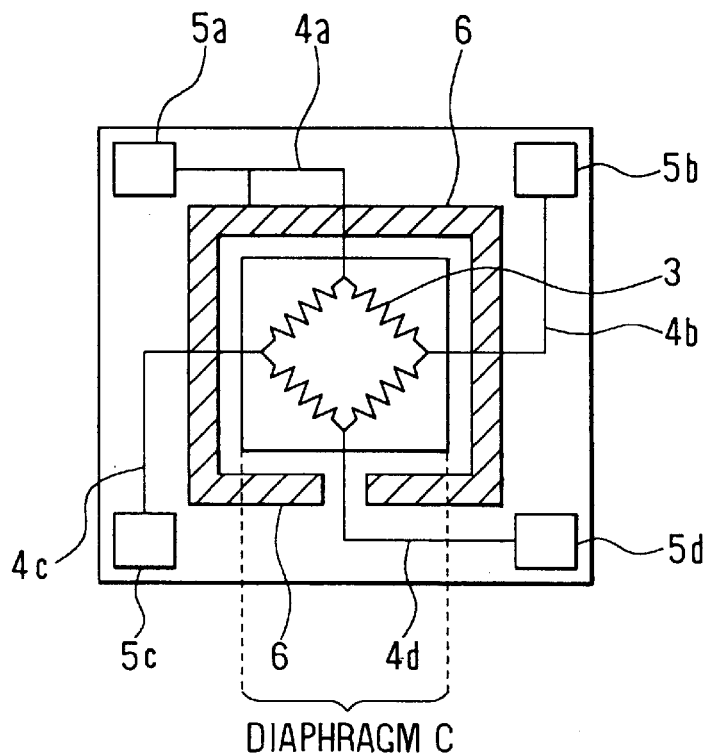
FIG. 6 is a plan view of a semiconductor pressure detection device according to a second embodiment of the present invention.

FIG. 6 shows a plan view of a semiconductor pressure detection device according to a second embodiment of the present invention.

The N+ type diffusion layer 6 is insulated from the aluminum wirings 4a–4d by the oxide layer (insulation layer) as in the first embodiment. Because the N+ type diffusion layer 6 is supplied with the highest voltage, and the aluminum wiring 4d is connected to ground through the bonding pad 5d, the difference in electric potential between the N+ type diffusion layer 6 and the aluminum wirings 4d is large. When noises are input through the bonding pad 5d, the difference in electric potential between the N+ type diffusion layer 6 and the aluminum wiring 4d may become much larger. As a result, the oxide layer (insulation layer) may break down where the N+ type diffusion layer 6 and the aluminum wiring 4d overlap.

Therefore, as shown in FIG. 6, the N+ type diffusion layer 6 is not formed under the aluminum wiring 4d connected to ground via the bonding pad 5d. That is, the N+ type diffusion layer 6 is formed in a ring except under aluminum wiring 4d. According to this embodiment, the oxide layer will not break down. With regard to the aluminum wirings 4b and 4c connected with the current source B through the bonding pads 5b and 5c, since the current source B usually includes a protection circuit against noises, the influence of the noise on the aluminum wirings 4b and 4c should be small. That is, the oxide layer should not break down under the aluminum wirings 4b and 4c. However, the N+ type diffusion layer 6 need not be formed under the aluminum wirings 4b and 4c, even through the influence from noise is small.

(Third Embodiment)

Figure 7:
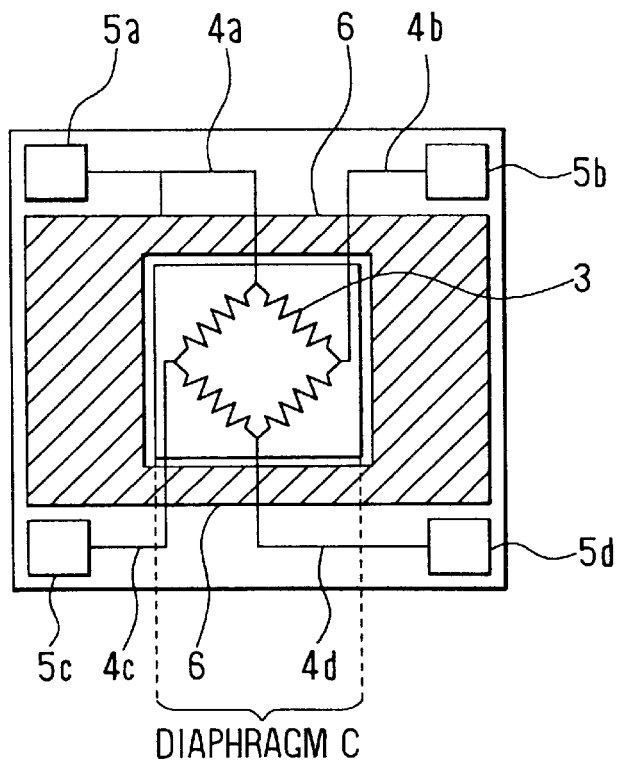
FIG. 7 is a plan view of a semiconductor pressure detection device according to a third embodiment of the present invention.

FIG. 7 shows a plan view of a semiconductor pressure detection device according to a third embodiment of the present invention.

As described above, when the semiconductor pressure detection device is operated and the electrochemical stop etching is executed, the electric potential within the entire N+ type diffusion layer 6 is almost the same. However, in fact, because the N+ type diffusion layer 6 has some resistance, an electric distribution is created. Therefore, if the N+ type diffusion layer 6 is as wide as possible, an electric distribution caused by the resistance is minimized.

Therefore, the semiconductor pressure detection device shown in FIG. 7 is formed such that the N+ type diffusion layer 6 is as wide as possible. The N+ type diffusion layer 6 is formed over the sensor section A except for the area where the diaphragm C and bonding pads 5a–5d are formed thereunder. Therefore, the difference of the electric potential between the gauge resistors 3 and the N− type epitaxial layer 2 is small when the semiconductor pressure detection device is operated, and the leakage characteristic in the sensor section A is improved. Also, when electrochemical stop etching is executed, the electric distribution extends almost parallel to the surface of the P− type silicon wafer 1. Thus, the thickness of the diaphragm C can be uniform.

In this embodiment, the N+ type diffusion layer 6 is not formed over the diaphragm C. However, it is possible to form the N+ type diffusion layer 6 over the diaphragm C so that the N+ type diffusion layer 6 does not influence the gauge resistors 3 formed over the diaphragm C.

As another method for making the thickness of the diaphragm C uniform, a ring-shaped or solid polygon aluminum wiring is formed over the entire N+ type diffusion layer 6, and contact holes are formed through the oxide layer 7 to connect the aluminum wiring with the N+ type diffusion layer 6. Because sheet resistance of the aluminum is small (0.003 Ω/□) compare to that of the N− type epitaxial layer 2 (800–2400 Ω/□) or the N+ type diffusion layer 6 (4 Ω/□) and the aluminum wiring covers all of the N+ type diffusion layer 6, the thickness of the diaphragm C can be uniform.

(Fourth Embodiment)

Figure 8:
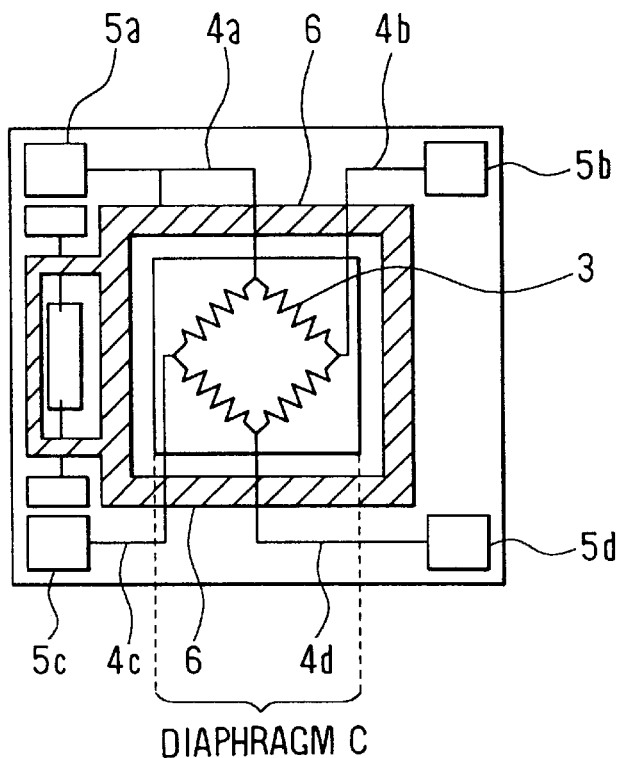
FIG. 8 is a plan view of a semiconductor pressure detection device according to a fourth embodiment of the present invention.

FIG. 8 illustrates a plan view of a semiconductor pressure detection device according to a fourth embodiment of the present invention. This semiconductor pressure detection device has the N+ type diffusion layer 6 such that it surrounds the temperature compensation resistor 100.

When the temperature compensation resistor 100 is surrounded by the N+ type diffusion layer 6, the temperature compensation resistor 100 can be supplied with the carriers from all directions where the N+ type diffusion layer 6 is formed. Thus, any influence from the depletion of the gauge resistors 3 is reduced. Therefore, oscillations described above can be completely prevented.

(Fifth Embodiment)

Figure 9:
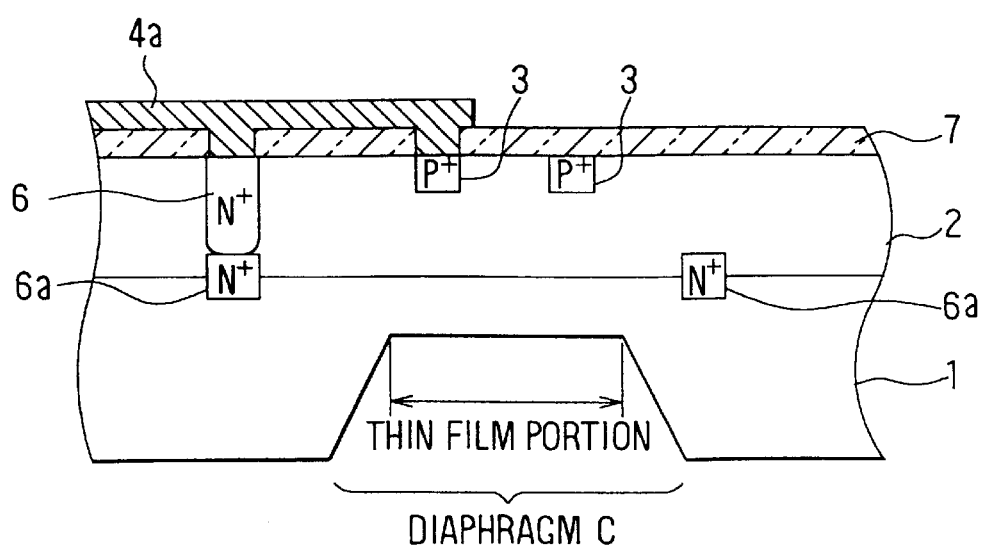
FIG. 9 is a sectional view of a semiconductor pressure detection device according to a fifth embodiment of the present invention.

FIG. 9 illustrates a sectional view of a semiconductor pressure detection device according to a fourth embodiment of the present invention. As shown in FIG. 9, this semiconductor pressure detection device has a buried N+ type diffusion layer 6a formed at a border between the N− type epitaxial layer 2 and the P− type silicon wafer 1. The buried N+ type diffusion layer 6a is formed over a tapered portion of the diaphragm C or over an area outside of the tapered portion. If the buried N+ type diffusion layer 6a is formed inside the tapered portion (a portion where a thin portion of the diaphragm C will be formed afterward), the portion where the diaphragm C will be formed is thick even if it is etched because the electrochemical stop etching is influenced by the electric potential of interface between the N− type epitaxial layer 2 and the P− type silicon wafer 1. As described above, when the buried N+ type diffusion layer 6a is formed at the border between the N− type epitaxial layer 2 and the P− type silicon wafer 1, the same effects as the first embodiment are obtained.

With regard to the method of producing the semiconductor pressure detection device of the present embodiment, it is necessary to form the buried N+ type diffusion layer 6a by deposition at the predetermined position before the N− type epitaxial layer 2 is formed on the P− type silicon wafer 1. Preferably, antimony as an impurity is doped between the N− type epitaxial layer 2 and the P− type silicon wafer 1 to form the buried N+ type diffusion layer 6a because the shape of the buried N+ type diffusion layer 6a made from antimony barely changes even when thermal annealing is executed. Also, it is necessary to form the N+ type diffusion layer 6 as a contact layer by the above-described method so that the highest voltage (the electric potential of the buried N+ type diffusion layer 6a and the electric potential of the N− type epitaxial layer 2 are larger than the electric potential of the gauge resistors 3) is supplied to the buried N+ type diffusion layer 6a through the N+ type diffusion layer 6. In this embodiment, the depth of the N+ type diffusion layer 6 is approximately 10 μm, and the depth of the gauge resistors 3 is 1–1.5 μm.

In the first to fifth embodiments, the diaphragm C is square. However, round, or polygon diaphragms are possible. In these cases, when the N+ type diffusion layer 6 is formed responsive to the shape of the diaphragm C, the diaphragm is uniformly supplied with electric potential.

In the third to fifth embodiments, when the N+ type diffusion layer 6 is not formed under the aluminum wirings 4d, like in the second embodiment, dielectric breakdown of the oxide layer (insulation layer) can be prevented.

Figure 10:
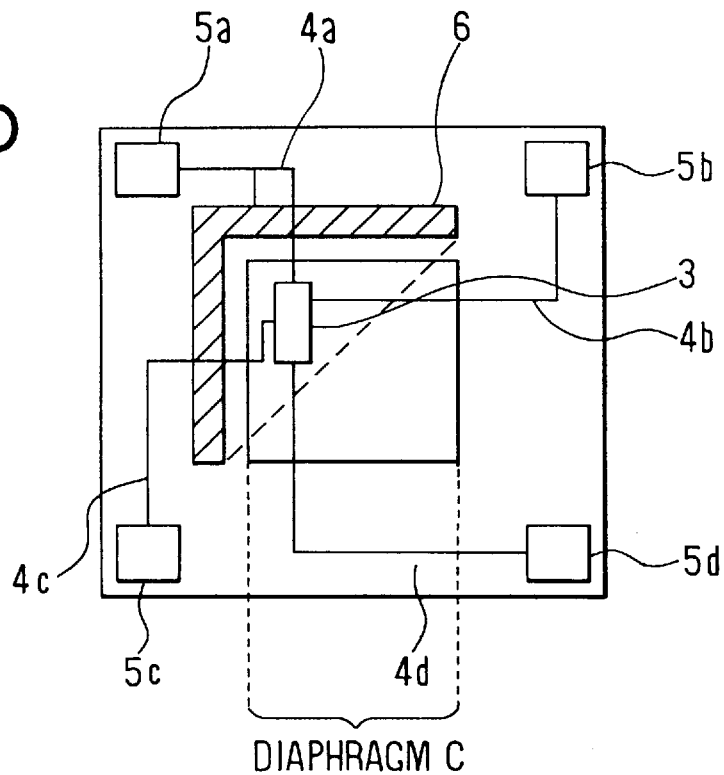
FIG. 10 is a plan view of a semiconductor pressure detection device according to another embodiment of the present invention.

As shown in FIG. 10, the N+ type diffusion layer 6 is formed so that it surrounds only two sides of the diaphragm C. In this structure, when the gauge resistors 3 is formed within a position surrounded by the N+ type diffusion layer 6 (within a dotted line which connects two edges of the N+ type diffusion layer 6), the same effects as the first embodiment are obtained.

Figure 11:
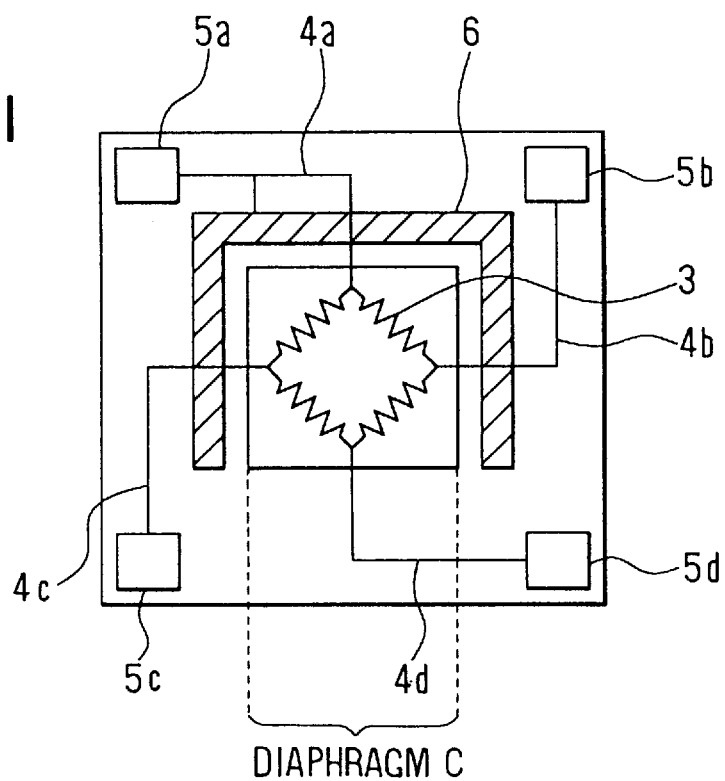
FIG. 11 is a plan view of a semiconductor pressure detection device according to another embodiment of the present invention.
Figure 12A:
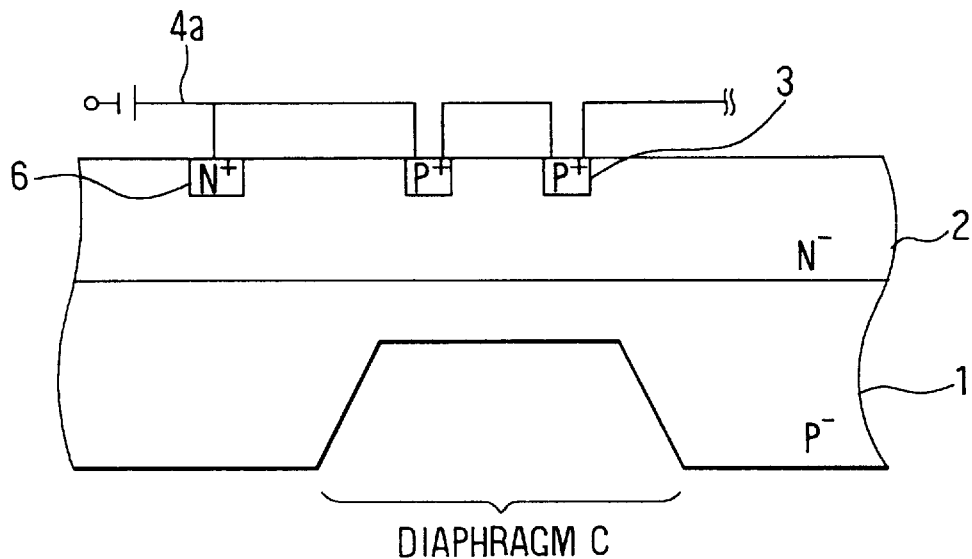
FIG. 12A is a sectional view of a known semiconductor pressure detection device.
Figure 12B:
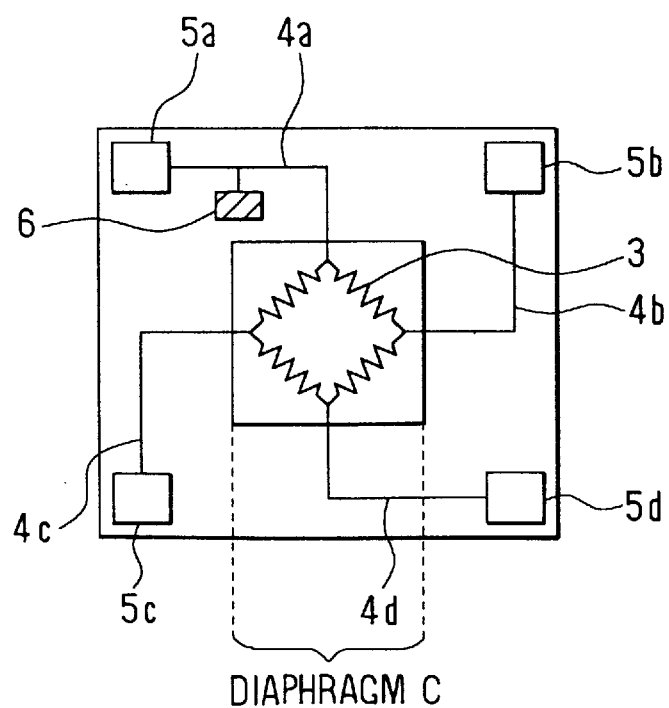
FIG. 12B is a plan view of electric connections of the semiconductor pressure detection device shown in FIG. 12A.

As shown in FIG. 11, the N+ type diffusion layer 6 is formed so that it surrounds three sides of the diaphragm C. In this structure, the N+ type diffusion layer 6 can surround the gauge resistors 3 as long as the gauge resistors 3 is formed over the diaphragm C.

We claim:

1. A semiconductor device comprising:
   a semiconductor substrate defining a diaphragm at a portion of the substrate that is thinner than a remainder of the substrate;
   a first conductivity type layer formed on a surface of the semiconductor substrate:
   gauge resistors of a second conductivity type formed in the first conductivity type layer and over the diaphragm;
   a first conductivity type area surrounding at least one part of the diaphragm to fix an electric potential of the first conductivity type layer; and
   a temperature compensation resistor formed in the first conductivity type layer outside the first conductivity type area;
   wherein the gauge resistors are disposed in a position surrounded by the first conductivity type area; and
   at least a portion of the first conductivity type area surrounds the temperature compensation resistor.

2. The semiconductor device of claim 1, wherein said first conductivity type area has an impurity concentration higher than the first conductivity type layer and is formed in the first conductivity type layer.

3. A semiconductor device comprising:
   a semiconductor substrate defining a diaphragm at a portion of the substrate that is thinner than a remainder of the substrate;
   a first conductivity type layer formed on a surface of the semiconductor substrate;
   gauge resistors of a second conductivity type formed in the first conductivity type layer and over the diaphragm; and
   a first conductivity type area surrounding at least one part of the diaphragm to fix an electric potential of the first conductivity type layer;
   wherein the gauge resistors are disposed in a position surrounded by the first conductivity type area; and
   the first conductivity type area is formed as a buried layer between the semiconductor substrate and the first conductivity type layer.

4. The semiconductor device according to claim 3, wherein the first conductivity type area is formed by doping antimony between the semiconductor substrate and the first conductivity type layer as an impurity.

5. The semiconductor device of claim 3, wherein said first conductivity type area has an impurity concentration higher than the first conductivity type layer and is formed in the first conductivity type layer.

6. A semiconductor device comprising:
   a semiconductor substrate defining a diaphragm at a portion of the substrate that is thinner than a remainder of the substrate;
   a first conductivity type layer formed on a surface of the semiconductor substrate;
   gauge resistors of a second conductivity type formed in the first conductivity type layer and over the diaphragm;
   a first conductivity type buried area formed between the semiconductor substrate and the first conductivity type layer to fix an electric potential of the first conductivity type layer;
   a first conductivity type diffusion area vertically formed in the first conductivity type layer to contact with the first conductivity type buried area; and
   a temperature compensation resistor formed in the first conductivity type layer outside of the first conductivity type area.

7. The semiconductor device according to claim 6, wherein a depth of the first conductivity type diffusion area is deeper than that of the gauge resistors.

8. The semiconductor device according to claim 7, wherein the depth of the first conductivity type diffusion area is approximately 10 μm, and a depth of a gauge resistors is between 1 and 1.5 μm.

9. The semiconductor device according to claim 6, wherein a depth of the first conductivity type diffusion area is deeper than that of the temperature compensation resistor.

10. The semiconductor device according to claim 9, wherein the depth of the first conductivity type diffusion area is approximately 10 μm, and a depth of the temperature compensation resistor is between 1 and 1.5 μm.

11. A semiconductor device comprising:

a semiconductor substrate defining a diaphragm at a portion of the substrate that is thinner than a remainder of the substrate;

a first conductivity type layer formed on a surface of the semiconductor substrate;

gauge resistors of a second conductivity type formed in the first conductivity type layer and over the diaphragm;

a first conductivity type area surrounding at least one part of the diaphragm to fix an electric potential of the first conductivity type layer; and a power terminal being supplied with the fixed electric potential, connected with the first conductivity type area;

wherein the gauge resistors are disposed in a position surrounded by the first conductivity type area.

12. The semiconductor device of claim 11, wherein said first conductivity type area has an impurity concentration higher than the first conductivity type layer and is formed in the first conductivity type layer.

13. A semiconductor device comprising:

a diaphragm formed at a reduced thickness portion of a semiconductor substrate whose surface is made of a first conductivity type layer;

bridge connected gauge resistors of second conductivity type formed on the surface of the semiconductor substrate; and a first conductivity type area fixing an electric potential of the first conductivity type layer; and a power terminal being supplied with the fixed electric potential, connected with the first conductivity type area;

wherein the first conductivity type area surrounds the diaphragm.

14. The semiconductor device of claim 13, wherein said first conductivity type area has an impurity concentration higher than the first conductivity type layer and is formed in the first conductivity type layer.

15. A semiconductor device comprising:

a semiconductor substrate defining a diaphragm at a portion of the substrate that is thinner than a remainder of the substrate;

a first conductivity type layer formed on a surface of the semiconductor substrate;

gauge resistors of a second conductivity type, arranged as a bridge circuit, formed in an outer layer of the first conductivity type layer and over the diaphragm;

a power electric wiring being supplied with a fixed electric potential, connected with a power terminal of the bridge circuit;

a ground terminal wiring, connected with a ground terminal of the bridge circuit;

mid-point electric wirings, for outputting a mid-point potential of the bridge circuit; and a first conductivity type area, whose impurity concentration is higher than the first conductivity type layer, surrounding at least one part of the diaphragm, formed in the first conductivity type layer and connected with the power electric wiring;

wherein the gauge resistors are disposed in a position surrounded by the first conductivity type area.

16. The semiconductor device according to claim 15, further comprising:

a power terminal being supplied with the fixed electric potential, connected with the first conductivity type area.

17. A method for producing a semiconductor device, the method comprising:

forming a first conductivity type layer on a semiconductor substrate;

forming gauge resistors of second conductivity type in the first conductivity type layer over a location of a diaphragm;

forming a first conductivity type area surrounding the location of the diaphragm to fix an electric potential of the first conductivity type layer; and supplying the fixed electric potential to a power terminal connected to the first conductivity type area.

18. The method for producing a semiconductor device of claim 17, wherein said first conductivity type area is formed with has an impurity concentration higher than the first conductivity type layer and is formed in the first conductivity type layer.

19. A semiconductor device comprising:

a semiconductor substrate defining a diaphragm at a portion of the substrate that is thinner than a remainder of the substrate;

a first conductivity type layer formed on a surface of the semiconductor substrate;

gauge resistors of a second conductivity type formed in the first conductivity type layer and over the diaphragm;

a first conductivity type area, whose impurity concentration is higher than the first conductivity type layer, formed in the first conductivity type layer and surrounding at least one part of the diaphragm to fix an electric potential of the first conductivity type layer; and a temperature compensation resistor formed in the first conductivity type layer;

wherein the gauge resistors are disposed in a position surrounded by the first conductivity type area, and the first conductivity area is disposed between the temperature compensation resistor and the gauge resistors.

* * * * *